United States Patent [19]

Irving, Jr. et al.

[11] 3,730,326
[45] May 1, 1973

[54] BAKERY PRODUCT TURN OVER APPARATUS

[75] Inventors: Frank M. Irving, Jr., York; Albert S. Schmidt, Sr., Wormleysburg; Ronald G. Andrus, Wrightsville; Herbert J. P. Beckius, York, all of Pa.

[73] Assignee: Alto Company, York, Pa.

[22] Filed: Aug. 2, 1971

[21] Appl. No.: 168,046

Related U.S. Application Data

[62] Division of Ser. No. 732,179, May 27, 1968, Pat. No. 3,596,747.

[52] U.S. Cl. ........................... 198/33 AD, 214/1 Q
[51] Int. Cl. .................................. B65g 7/00
[58] Field of Search ............... 214/1 Q, 310, 312; 198/33 AB, 33 AD, 34 R, 76

[56] References Cited

UNITED STATES PATENTS

| 2,996,862 | 8/1961 | Johnson et al. | 271/41 X |
| 3,403,768 | 10/1968 | Tobey et al. | 214/1 Q X |
| 1,783,814 | 12/1930 | Schroeder et al. | 214/1 Q X |
| 3,217,858 | 11/1965 | Fellner et al. | 198/34 |

*Primary Examiner*—Gerald M. Forlenza
*Assistant Examiner*—Frank E. Werner
*Attorney*—Thomas Hooker

[57] ABSTRACT

Bakery product units are received from a depanner and/or slicer at a marshaling station in two discrete rows. Product units from the two rows are then released in a controlled manner and are advanced in timed relation with or without inversion of the units in one or both rows. The product units in one row move gradually into superposed relation with corresponding product units of the second row and each superposed pair of product units is then engaged and advanced in unison until stacked registering relationship of each superposed pair is attained.

3 Claims, 18 Drawing Figures

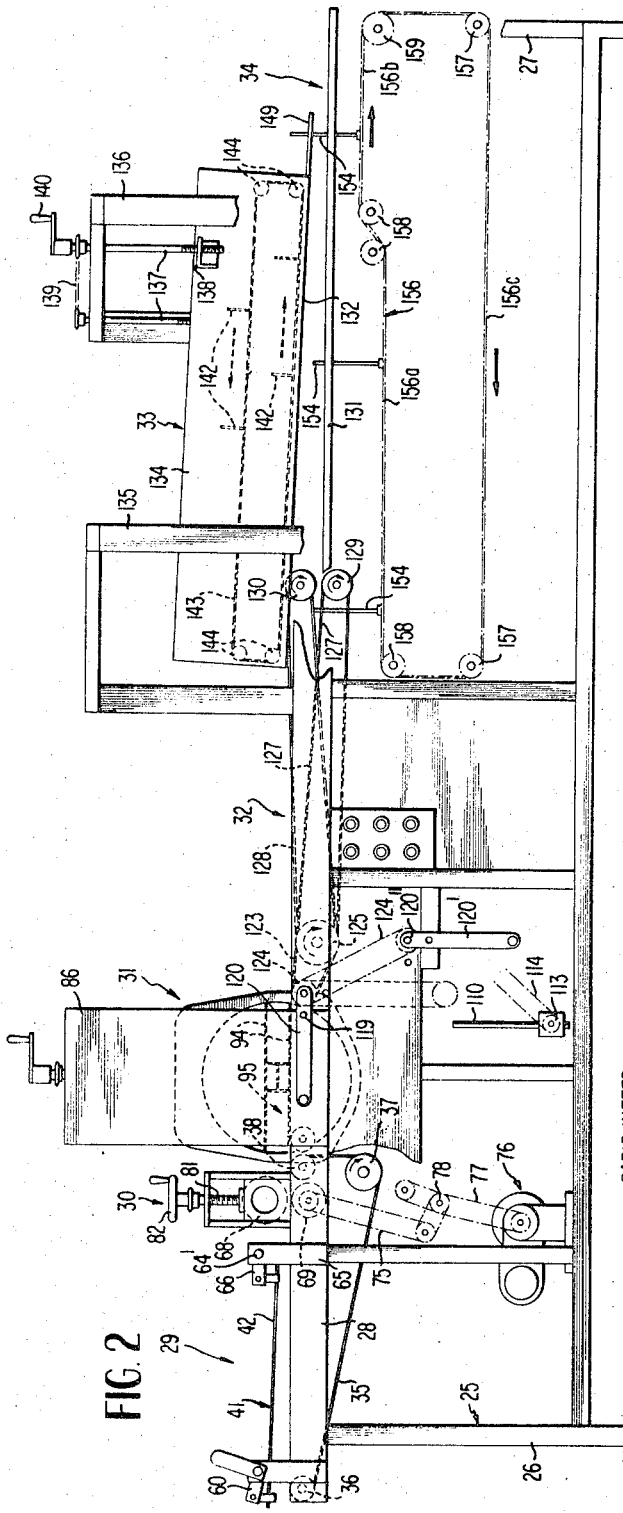
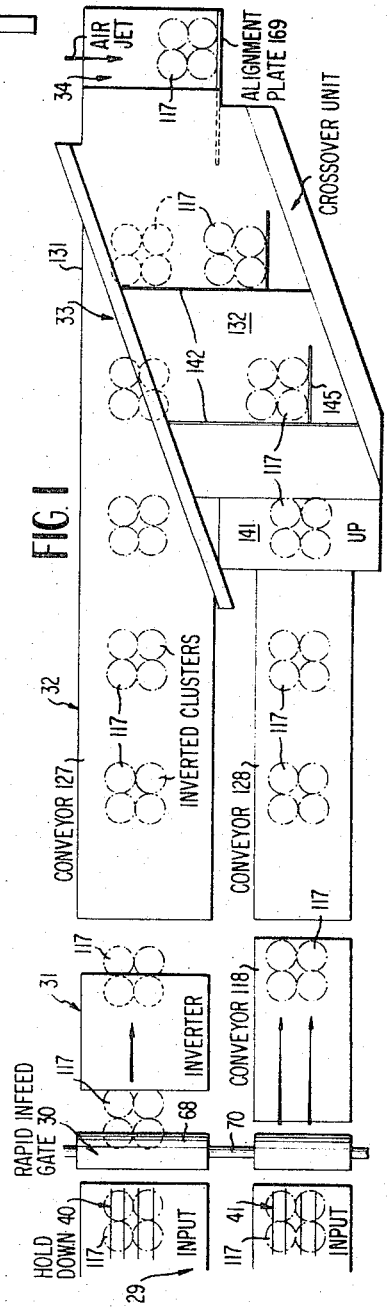
FIG. 2
FIG. 1
INVENTORS
FRANK M. IRVING, JR.
ALBERT S. SCHMIDT, SR.
RONALD G. ANDRUS
HERBERT J. P. BECKIUS
BY Wynne & Tieken
ATTORNEYS

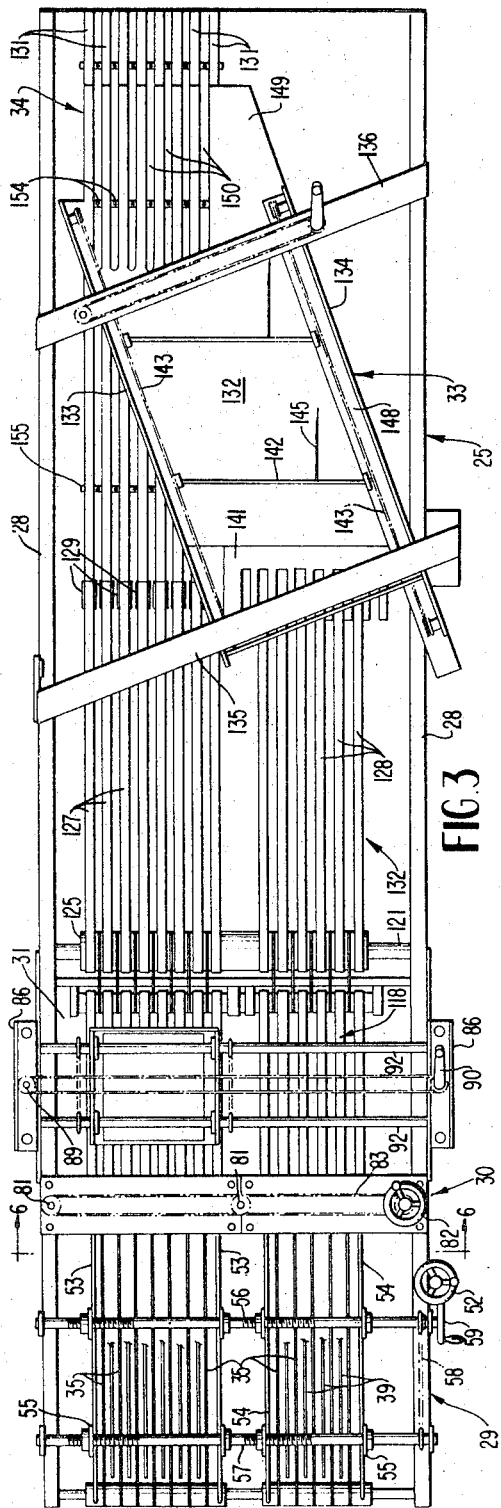

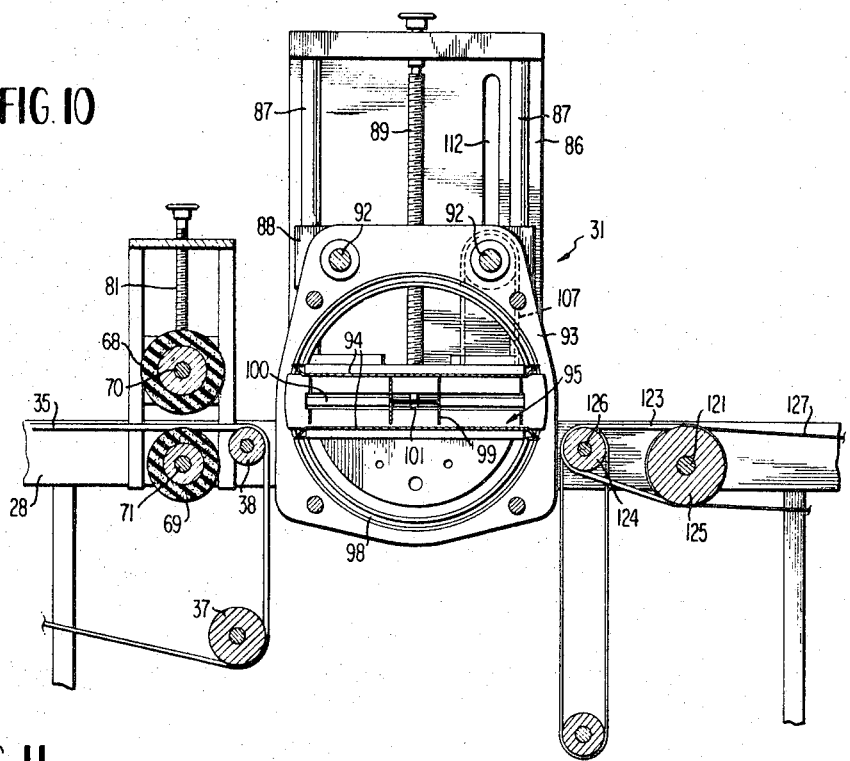
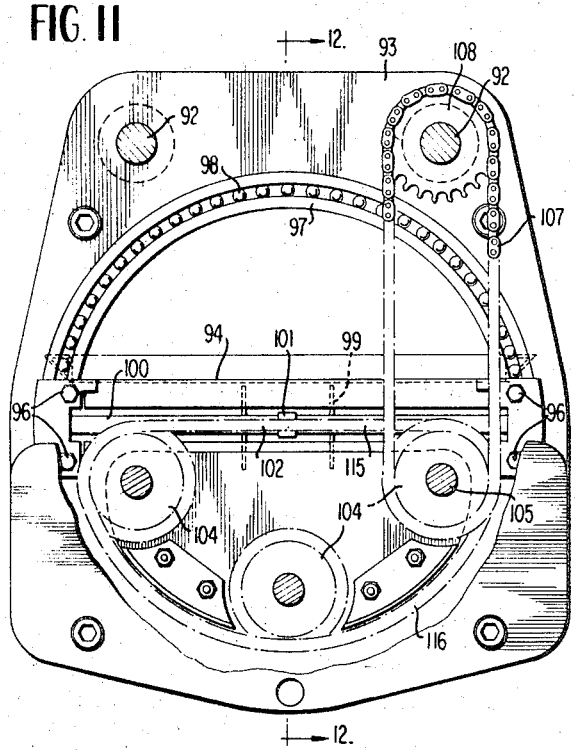

3,730,326

BAKERY PRODUCT TURN OVER APPARATUS

This is a division of application Ser. No. 732,179, filed May 27, 1968 which issued Aug. 3, 1971, as U.S. Pat. No. 3,596,747.

BACKGROUND OF THE INVENTION

Machines and devices are known in the prior art for stacking bakery products, such as roll clusters, as the products are traveling from a depanner or slicer toward packaging equipment. One example of such a prior art machine is found in U. S. Pat. No. 3,322,314, issued May 30, 1967, to Irving, Jr. et al. As disclosed in this patent, bakery product units are advanced from a marshaling zone to a turn-over station. Forward movement of one product unit in each lateral pair of units is arrested while the companion unit is lifted and turned over laterally and is dropped freely on top of the second unit in stacked relationship. The stacked product units are then advanced from the turn-over station by a conveyor toward packaging equipment or the like. While the patented machine operates satisfactorily, it has certain inherent deficiencies, the most important of which is lack of desirable speed in stacking the product units. Additionally, the mode of operation involving lifting of one product unit and allowing it to fall freely through a considerable distance onto the second unit is somewhat awkward and slow and requires extremely accurate timing and alignment of parts.

The invention method and apparatus improves greatly upon the prior art in that the invention is much faster and more reliable in achieving accurate stacking and registration of product units with or without inversion of one or both units in each pair and with the elimination of the dropping or free-falling movement of one product unit upon the other, noted above. In the present invention, laterally related product units are moved in a controlled manner from a marshaling station and optionally the units in either of two discrete rows or both rows may be quickly inverted individually without being displaced on their main path of movement. The product units in one row are gradually moved diagonally toward superposed relation with corresponding product units of the second row and companion superposed units are then engaged by a common conveying means and advanced gently into stacked registering relation without any appreciable dropping or free-falling of the top product unit in the stacked pair. The process is continuous, very reliable and quite rapid. Furthermore, the apparatus employed in the practice of the method is relatively simple in construction, fully adjustable and economical.

SUMMARY OF THE INVENTION

Clusters of rolls or similar bakery products are received from a depanner and/or slicer on an inlet conveyor means in discrete parallel rows at a product marshaling station. Hold-down means is provided at the marshaling station to arrest movement of the product units in a controlled manner without damaging them. Leading product units in the rows are engaged by rapid infeed gates or rollers which deliver the leading clusters in properly timed relationship to an inverter device and a conveyor or, optionally, to a pair of conveyors if inversion is not desired, or to a pair of inverters.

Laterally related pairs of product units are advanced away from the inverting zone and one unit of each pair is conveyed upwardly slightly and is carried diagonally toward the other product unit in the related pair until the two units are superposed. At this point, a pusher means common to the superposed pair of product units engages the pair and further advances the pair while they move gently into stacked relation and are further aligned by an abutment member and an aligning air jet. From this point, the accurately stacked product units can be carried to a packaging machine or the like by a conveyor.

BRIEF DESCRIPTION OF THE DRAWINGS

FIG. 1 is a diagrammatic plan view of the method and apparatus embodying the invention;

FIG. 2 is a partly diagrammatic side elevation of the apparatus;

FIG. 3 is a plan view of the apparatus with parts removed and omitted for clarity of illustration;

FIG. 4 is a fragmentary plan view of product hold-down means omitted in FIG. 3;

FIG. 5 is an enlarged fragmentary side elevational view, partly in section and partly broken away, showing the infeed conveyor and product hold-down means;

FIG. 10 is a fragmentary longitudinal vertical section taken on line 10—10 of FIG. 8;

FIG. 11 is a similar and enlarged section taken on line 11—11 of FIG. 8;

FIG. 12 is a vertical section taken on line 12—12 of FIG. 11;

DETAILED DESCRIPTION OF THE PREFERRED EMBODIMENT

Figure 7:
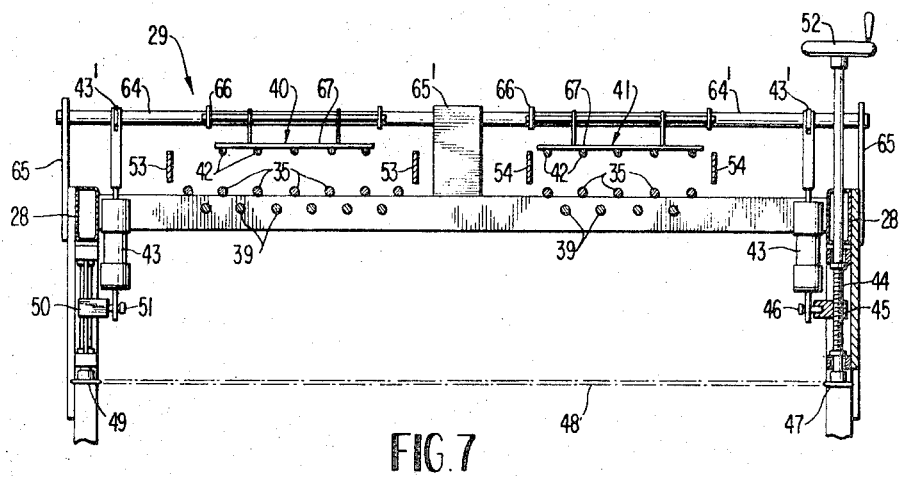
FIG. 7 is a similar section taken on line 7—7 of FIG. 4.

Referring to the drawings in detail, wherein like numerals designate like parts throughout the same, reference is made first to FIGS. 2 and 3 which show the apparatus in its entirety. In these figures, a supporting framework 25 is shown for positioning the several working components of the apparatus at a convenient elevation above the floor and this framework includes end leg units 26 and 27 as shown and a pair of main upper horizontal side rails 28 constituting the bed of the apparatus. The details of the framework 25 may be varied and are not important.

Continuing to refer to FIGS. 2 and 3, the product intake end of the apparatus constitutes a product marshaling station 29, following which is a rapid infeed means 30 for the leading product units at the marshaling station 29. A product inverting or turn-over means 31 is disposed close to the infeed means 30 to receive product units directly therefrom and following the turn-over means is a conveyor section 32 of the apparatus which carries discrete rows of the product units in a controlled manner toward a stacking and discharge station. A diagonal crossover conveyor device 33 is provided to convey product units from one row into superposed relation with companion units of the second row. Finally, the apparatus includes a discharge station or means 34 where the pairs of product units are brought into stacked registering relation and proper alignment prior to delivery to packaging equipment or the like.

MARSHALING STATION

Figure 6:
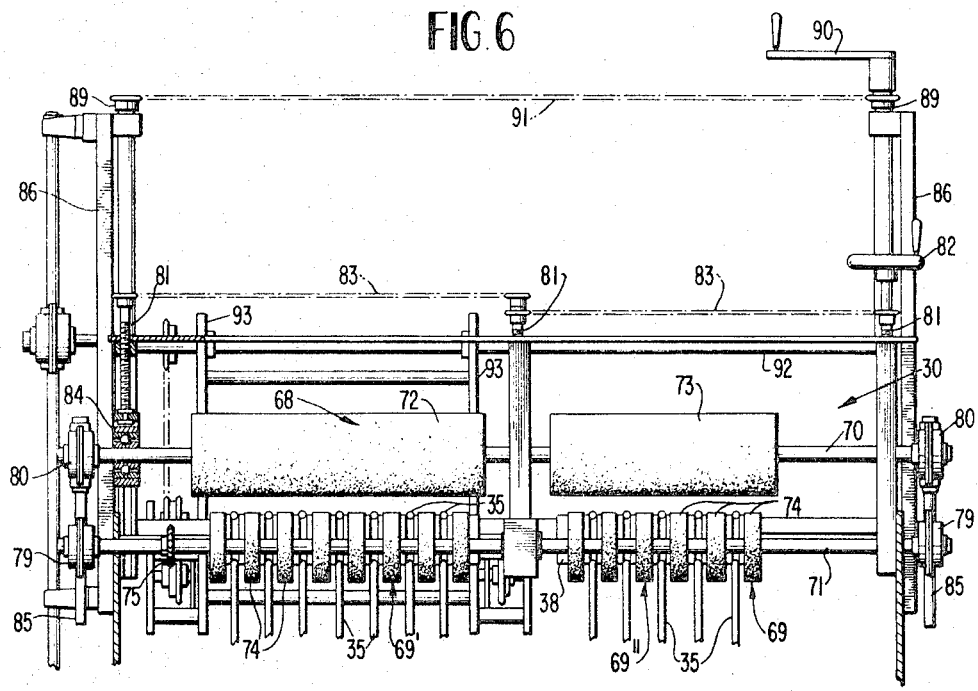
FIG. 6 is an enlarged transverse vertical section taken on line 6—6 of FIG. 3.

The marshaling station 29, referring to FIGS. 2 through 6, comprises two laterally spaced groups of horizontal parallel longitudinal product intake conveyor belts 35 which are endless and engage about rollers 36, 37 and 38, as shown. The belts 35 are relatively slack so that they may yield readily under the force of certain product hold-down means, to be described. Closely beneath the conveyor belts 35 and midway between adjacent pairs of the belts, FIG. 6, are stiff rods 39 which engage the bottoms of the product units when the latter are clamped by the said hold-down means. These rods 39 are fixed relative to the belts 35 and are supported on the frame structure 25 in any desired manner.

Above the belts 35 are substantially horizontal product hold-down grids 40 and 41 comprising rigidly connected spaced parallel rods 42, FIGS. 4, 5 and 6. The two grids 40 and 41 are independently operable above the respective groups of belts 35 and their purpose is to clamp the product units moving with the relatively slack belts 35 against the stationary rods 39 to thereby arrest the movement of the product units while the belts slide harmlessly thereunder.

The forward ends of the grids 40 and 41 are independently raised and lowered by fluid pressure operated vertical cylinder-piston units 43 disposed near and inwardly of the frame side rails 28, FIGS. 5 and 7. The extensible and retractable piston rods of these units are pivotally connected at their tops with crank arms 43' rigid with a supporting cross shaft, to be described. The cylinder-piston units 43 are also bodily adjustable vertically relative to the apparatus framework by means of a vertical screw shaft 44 carrying a nut member 45 connected at 46 to the bottom of one unit 43. The lower end of screw shaft 44 carries a sprocket gear 47 connected with a horizontal transverse sprocket chain 48 which in turn engages a sprocket gear 49 on the lower end of a second vertical screw shaft near the opposite side of the apparatus, carrying a nut 50 connected at 51 with the second cylinder-piston unit 43. By turning the hand wheel 52 of screw shaft 44, both units 43 may be bodily raised and lowered in unison. The units 43 are utilized to raise and lower the hold-down grids 40 and 41 with respect to bakery products of a given size or thickness. When products having a significantly greater or lesser thickness must be accommodated by the apparatus, the screw shaft 44 is utilized to raise or lower the units 43.

The rear ends of the grids 40 and 41, FIG. 5, are suspended from crank arms 60 by bracket members 61 pivoted thereto, the arms 60 being carried on a cross shaft 62 supported at its ends by bearing plates 63 on the side rails 28. A two-part cross shaft 64-64' mounted on upstanding bearing plates 65 and a center bearing 65' near the forward ends of the grids 40 and 41 carries crank arms 66 from which the forward ends of the hold-down grids are suspended by bracket means 67. The previously-described crank arms 43' connected with the raising and lowering units 43 are secured to the cross shaft sections 64-64', as noted.

In order to assembly or marshal the bakery product units such as clusters of hamburger rolls, in two discrete rows at the marshaling station 29, pairs of laterally spaced parallel guide bars 53 and 54 are provided closely above the belts 35. The guide bars are carried by dependent arms 55 on transverse screw shafts 56 and 57. The parallel screw shafts are operatively connected by sprocket gearing 58 and the shaft 56 carries a hand wheel 59 to facilitate turning it. By utilizing this hand wheel, the spacing between the pairs of guide bars may be adjusted for proper guidance of the product units in the two discrete rows.

RAPID INFEED STATION

The mentioned rapid infeed means 30 which advances laterally spaced pairs of product units away from the marshaling station in timed relation comprises upper and lower relatively large diameter infeed rollers 68 and 69, mounted on rotatable shafts 70 and 71 to turn therewith, said shafts being in vertical alignment. The rollers 68 and 69 are each formed in two sections 72 and 73 and 69' and 69'', respectively, FIG. 6. As best shown in FIG. 10, the infeed rollers have a solid core and an outer heavy layer of soft compressible material such as foam rubber or foam plastic so that the rollers are resilient. The lower roller 69, FIG. 6, is also formed in plural segments 74 to provide clearance for the belts 35 passing forwardly to the guide roller 38, FIG. 10. The upper runs of belts 35 are generally tangent to the top of roller 69 so that these belts may carry the product units to the rapid infeed rollers when the units are released by hold-down grids 40 and 41. The two sections 72 and 73 of the upper infeed roller are entirely covered with the compressible material, whereas this material is applied in strips to the lower roller segments 74.

As shown in FIG. 2, the lower roller 69 is driven through suitable gearing 75 which may include clutch and brake means, not shown, by means of which the infeed rollers are intermittent in operation. The gearing 75 derives power from a main motor 76, and additional gearing 77 connected with the motor 76 drives a main transverse drive shaft 78 from which other powered components of the apparatus are driven, as will be described.

Driving power from the shaft 71 and roller 69 is transmitted to the upper shaft 70 and roller 68 by conventional right angular drives 79 and 80 whose details need not be described. As viewed in FIG. 2, the upper infeed roller 68 will turn counterclockwise whereas the lower roller 69 will turn clockwise so that the product units passing therebetween will be fed away from the marshaling station 29 by the soft sponge infeed rollers.

The upper roller 68 is vertically adjustable through the medium of vertical screw shafts 81, one of which has a hand wheel 82 thereon. The several screw shafts 81 are connected for turning in unison by chain gearing 83, and when the screw shafts are turned, they cause the raising or lowering of bearing assemblies 84 within which the shaft 70 is journaled and supported. The shaft 71 for roller 69 remains at a fixed elevation. Vertical drive shafts 85 interconnecting the right angular drives 79 and 80 move upwardly and downwardly with the drives 80 when the shaft 70 is vertically adjusted by turning the hand wheel 82. The shafts 85 transmit power between the drives 79 and 80 in all adjusted positions and this construction is conventional regarding the shafts 85.

TURN-OVER STATION

The turn-over means 31 comprises vertical support plates 86 secured rigidly to the frame rails 28 and extending thereabove for a considerable distance. Pairs of vertical guide bars 87 are secured rigidly to the plates 86 close to their inner sides, and vertically shiftable crossheads 88 engage the guide bars 87 and are adjustable thereon under the influence of vertical screw shafts 89 also near the plates 86, one of which is equipped at its top end with a hand crank 90. The two screw shafts 89 are interconnected by chain gearing 91 so as to turn in unison for raising and lowering the crossheads 88 which have screw-threaded engagement with the adjusting screw shafts. The crossheads 88 carry a pair of spaced transverse horizontal bars 92 at one elevation and these bars are raised and lowered in unison by turning the crank 90.

The product inverting or turn-over mechanism shown in detail in FIGS. 10 through 13e constitutes an important feature of the invention and comprises vertical frame sides 93 suspended from the bars 92, as shown, whereby the entire mechanism carried by the frame sides 93 may, when required, by manually adjusted laterally along the bars 92 to position the turn-over device at either side of the apparatus for inverting product units in either discrete row. As shown, the turn-over mechanism is positioned at the left-hand side of the apparatus as viewed in FIGS. 6 to 9 and will be described in this position. The remaining elements of the turn-over mechanism, now to be described, are bodily carried by the frame sides 93 and are thus movable therewith when the mechanism is raised and lowered by the screw shafts 89 or shifted laterally, as described.

Referring now to FIGS. 10 through 13e, the turn-over mechanism further comprises a pair of spaced parallel plates 94 forming between them a relatively shallow passage 95 for product units which are to be inverted while remaining on their same longitudinal path of travel, that is, without lateral displacement. The two plates 94 forming this passage 95 are secured as at 96, FIG. 12, to the inner race 97 of a large ball bearing 98 whose outer race is fixedly held in the frame side 93, FIGS. 11 and 12. The same construction is present on both sides of the turnover mechanism for attaching the ball bearing to the element 93 and for attaching the plates 94 to the inner race of the ball bearing.

The mechanism further includes a reciprocating pusher plate or member 99 which traverses the passage 95 from one open end thereof to the other end, as shown in FIGS. 13a to 13e. The pusher plate 99 is guided in its movement by guide rods 100 which are also secured to the internal races 97 of the two bearings. The opposite sides of the pusher plate unit carry extensions 101 which are slidably mounted on the rods 100, as best shown in FIG. 12.

A drive chain 102 for the turn-over mechanism travels in a D-shaped path as depicted in FIG. 11 including an upper horizontal run and a lower approximately semi-circular run. One such chain is provided at each side of the mechanism and is connected as at 103, FIG. 12, with one of the elements 101 of the pusher plate. Each chain 102 engages three equidistantly spaced sprocket gears 104, as indicated, and the shaft 105 of one sprocket gear is powered by another sprocket gear 106, connected by a chain 107 with an overhead sprocket gear 108 on one of the bars 92 which is rotational. The bar 92 and sprocket gear 108 in turn are driven through a conventional right angular drive unit 109, vertically movable with the bar 92 on a vertical drive shaft 110 journaled for rotation in bearings 111 which are stationary. A slot 112, FIG. 10, is provided in the adjacent plate 86 to allow vertical movement of the end extension of the rotary bar 92 connected with the drive 109. The vertical shaft 110, FIG. 2, is driven near the bottom of the apparatus through another conventional right angular drive unit 113 in turn deriving its power from gearing 114 ultimately connected with and driven by the main motor 76. Intermediate parts of the main drive gearing leading from the motor 76 have been omitted from the drawings for simplicity and because such gearing is conventional and need not be fully shown for a proper understanding of the invention. It should be apparent, however, that when the vertical drive shaft 110 is driven, power is applied to the bar or shaft 92 carrying sprocket gears 108 and through the related chains 107 and associated gearing shown in FIGS. 11 and 12, the drive chains 102 will be operated for producing the cycle of movement of the turn-over mechanism graphically depicted in FIGS. 13a–13e.

As shown in these figures, the upper straight run 115 of each chain 102 constitutes the travel segment of the pusher bar 99, whereas the lower curved run 116 constitutes the rotational segment of the drive for the parallel plates 94 and associated elements including the interior bearing race 97. The turn-over mechanism in its entirety is actually a constant speed intermittent motion mechanism. As shown in FIGS. 13a–13e, the pusher bar 99 is stationary and does not reciprocate relative to the two plates 94 while the turning of the plates is taking place as in FIGS. 13d and 13e.

Figure 13A:
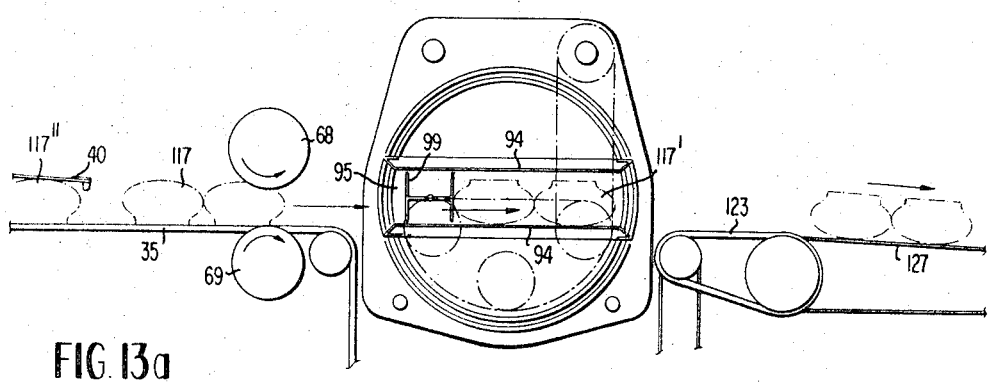
FIGS. 13a through 13e are partly diagrammatic side elevational views of the turn-over device in various positions during a cycle of operation.

Referring first to FIG. 13a, the mode of operation is essentially as follows: regarding the turn-over means 31. The shaft 110 is driving the chains 107 and in turn sprocket gears 104 and D-shaped chains 102. In FIG. 13a, the rotational portion of the turn-over cycle has just been completed, and the pusher bar 99 is at the rear end of the passage 95 between the two plates 94, and is moving toward the forward end of the passage and discharging the inverted product unit 117'. At this moment, the rapid infeed rollers 68 and 69 start to rotate in the direction of the arrows and feed the product unit 117 into the passage 95 immediately behind the moving pusher bar, as further illustrated in FIGS. 13b and 13c. At this moment, as shown in FIG. 13a, the hold-down grid 40 is in the down or active position.

Figure 13B:
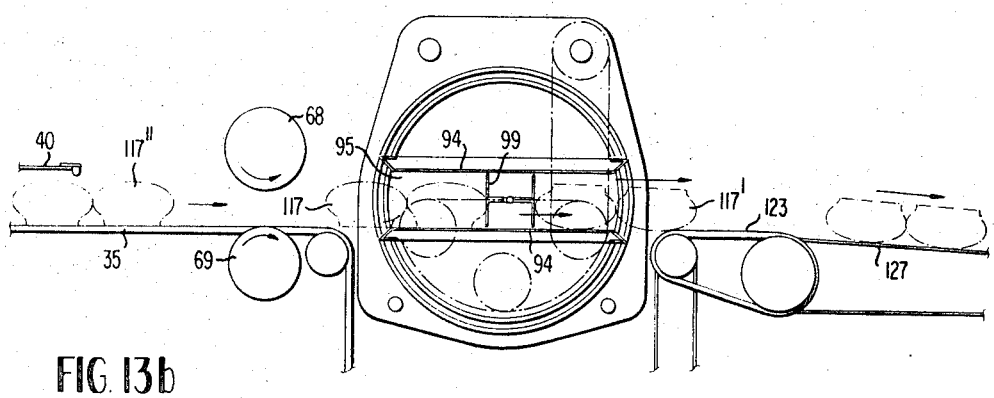
Figure 13C:
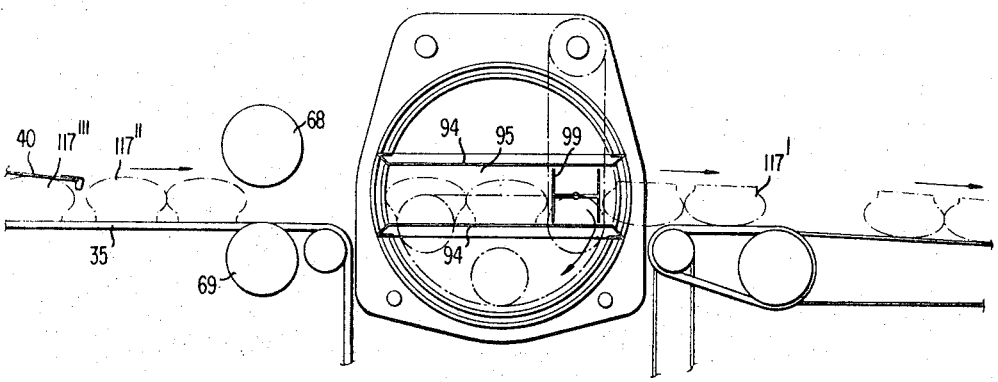

In FIG. 13b, product unit 117' is partially discharged from passage 95. Product unit 117 is partially inside of passage 95 and is now moving at a relatively high velocity to slide completely into the passage until stopped by pusher bar 99 as shown in FIG. 13c. The rapid infeed rollers 68 and 69 are still rotating as shown by the arrows in FIG. 13b until product unit 117 completely disengages the rollers. The hold-down grid 40 elevates when product unit 117 is about three-fourths beyond the nips of the rollers 68 and 69 and allows product unit 117'' to move forwardly with belts 35. Rollers 68 and 69 propel product unit 117 at a much higher velocity than the belts 35 move product unit 117''.

In FIG. 13c, product unit 117' is almost completely discharged from passage 95 and pusher bar 99, together with plates 94, starts on its circular path as shown by the arrow. Product unit 117 is now completely inside of passage 95 and against pusher bar 99. The infeed rollers 68 and 69 have stopped and product unit 117'' has moved into the space vacated by the product unit 117. The hold-down grid 40 moves down immediately behind product unit 117'' and before this unit reaches infeed rollers 68 and 69.

Figure 13D:
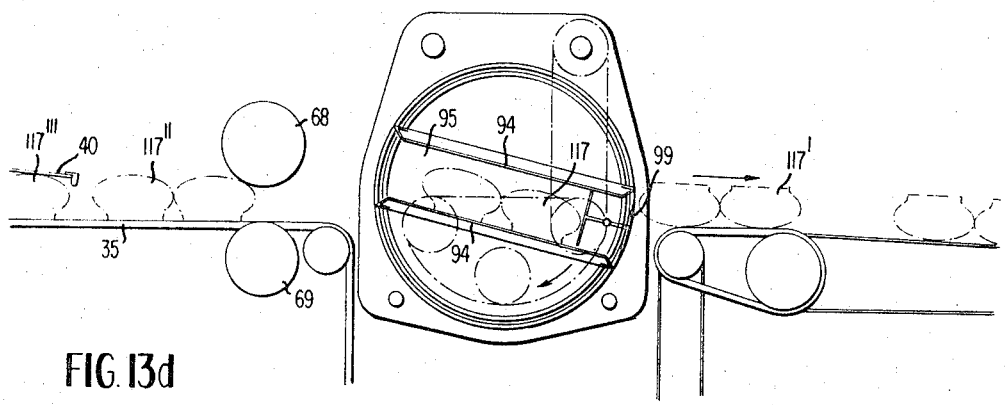

In FIG. 13d, product unit 117' is completely discharged from the passage 95 and pusher bar 99, with plates 94, has started on its semi-circular path of movement. Product unit 117'' is being held back by the stationary rollers 68 and 69 while the belts 35 are sliding beneath it. Product units 117''' are being held back by the grid 40 at this time.

Figure 13E:
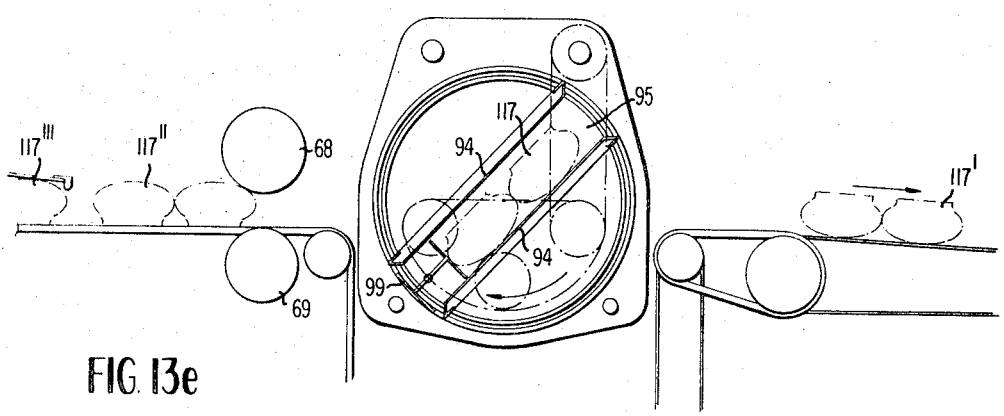
Figure 14:
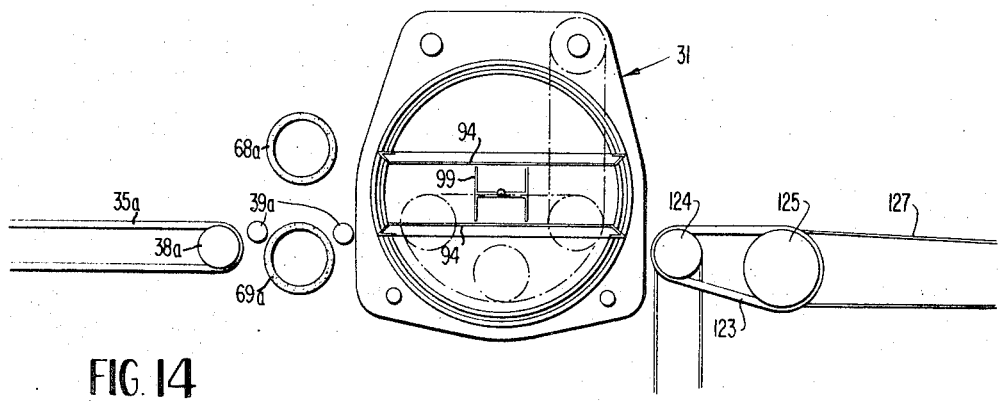
FIG. 14 is a partly diagrammatic view similar to FIG. 10 showing a modification.

FIG. 13e shows product unit 117' moving toward the discharge end of the apparatus illustrated in FIG. 14. Product unit 117 is now partially inverted and is being held by pusher bar 99 and plates 94. Product unit 117'' is in position to start a new cycle as soon as pusher bar 99 reaches the position shown initially in FIG. 13a.

The pusher bar 99 is constantly moving on the D-shaped path at the constant speed of the chains 102. Relative to the passage 95, the pusher bar is moving only on its horizontal run and during this time the passage 95 is stationary or non-rotating. On the lower semi-circular path of movement of the pusher bar, FIGS. 13d and 13e, there is no movement of the pusher bar in the passage 95 relative to the plates 94, but the passage itself is being turned upside-down along with the product unit 117 within it. Actually, therefore, the pusher bar 99 is never stationary in space although it does become stationary relative to the plates 94.

Figure 8:
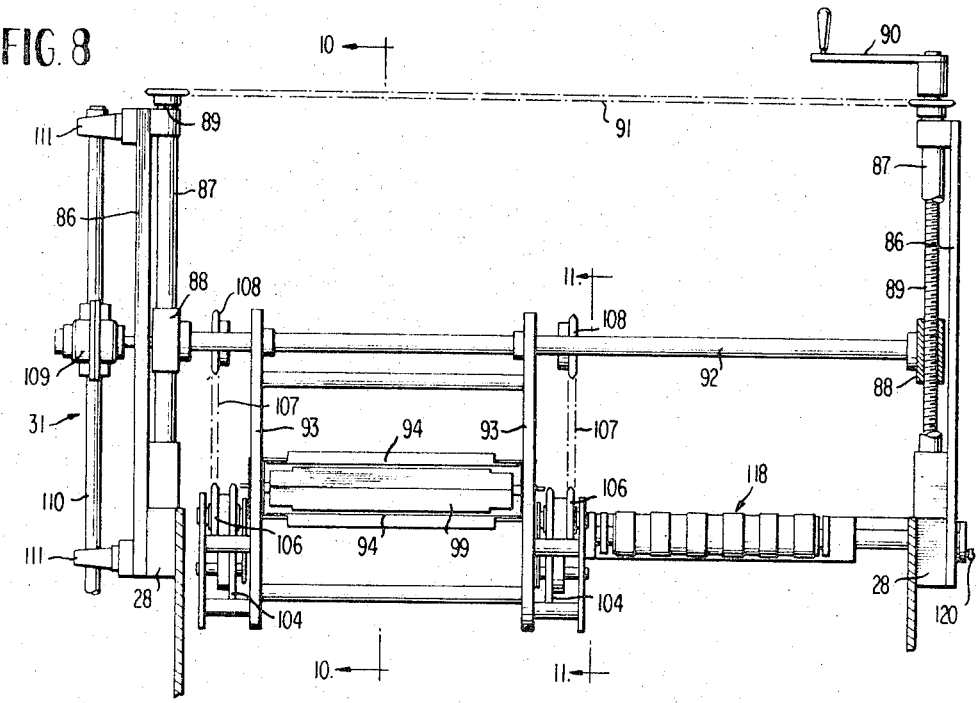
FIG. 8 is a transverse vertical section taken on line 8—8 of FIG. 9.
Figure 9:
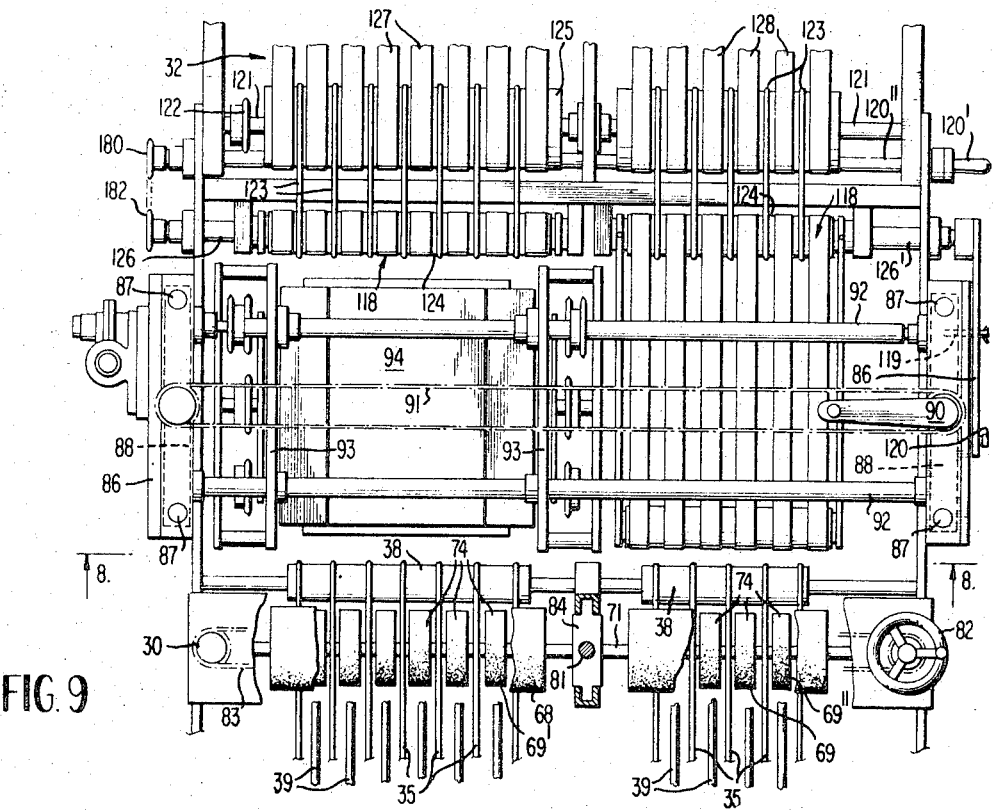
FIG. 9 is a fragmentary plan view on an enlarged scale of that portion of the apparatus depicted in FIG. 8 adjacent the turn-over device and associated elements.

As shown in FIGS. 8 and 9, a relatively short conveyor belt section 118 occupies the space laterally adjacent the turn-over mechanism in the other product row beneath the bars 92. As stated, the turn-over mechanism can be shifted laterally on the bars 92 to handle product units moving in either row through the apparatus. Additionally, the entire turn-over mechanism can be raised to a non-use position above the conveyor bed where no inverting of the product in either row is desired. For example, the products in one row may enter the apparatus already inverted with respect to the products in the second row. In some cases, a pair of the turn-over mechanisms 31 may be employed side-by-side instead of a single mechanism and in these respects the method and apparatus is highly versatile.

In the arrangement shown in the drawings, the conveyor section 118 is employed to bridge the gap in the conveyor bed which would otherwise be occupied by the turn-over mechanism. If this mechanism is shifted laterally to service the other row of products, then the conveyor section 118 may be employed at the position of the turn-over mechanism in FIGS. 8 and 9.

The conveyor sections 118 are raised and lowered independently by swinging on the axes of their shafts 126 and 126'. The shaft 126' has a hand crank 120 on the operator's side of the apparatus which is turned for raising and lowering the conveyor section 118 on the near side. A locking pin 119 is provided to lock the handle 120 and the associated conveyor section in the raised or lowered position. The conveyor section 118 on the far side of the apparatus is raised and lowered by another hand crank 120' connected with a transmission shaft 120'' operating sprocket gearing 180 on the far side of the apparatus, said gearing including a sprocket gear 182 on the shaft 126 of the far side conveyor section 118. By this means the operator on one side of the apparatus may control the raising, lowering and locking independently of the two conveyor sections 118.

As viewed in FIG. 9, the conveyor section 118 on the left hand or far side of the apparatus is lowered while the opposite side conveyor section is locked in the up or active position. Belts 123 drive conveyor sections 118 from rolls 125 to rolls 124, the latter idling or free-wheeling on shafts 126 and 126'.

APPARATUS CONVEYOR SECTION

The previously-mentioned downstream conveyor section 32 of the apparatus follows immediately after the turn-over means 31. The shaft 121, FIG. 9, is powered by suitable gearing from the main drive motor 76 leading to a sprocket gear 122 on this shaft. The narrow belts 123 engage rollers 125 on the shaft 121, as stated, and also engage drive rollers 124 on the conveyor sections 118. The rollers 125 also engage and drive strip or tape belts 127 and 128 in the two rows or product paths, FIGS. 3 and 14. The belts 127 and 128 engage additional rollers 129 and 130 a substantial distance downstream from the rollers 125 as seen in FIG. 2. This figure also shows that the belts 127 slope downwardly somewhat from the rollers 125 whereas the belts 128 slope upwardly. To effect this arrangement, the roller 130 is disposed above rollers 129.

SUMMARY OF OPERATION

The main drive motor 76 and output gearing produces operation of the infeed belts 35, rapid infeed rollers 68 and 69, turn-over mechanism, conveyor belts 127 and 128, crossover conveyor chains 143 and chains 156 and 160 of the pusher finger conveyor all in unison. These various components are locked together in their drives for proper synchronism and timing.

With the above situation prevailing, the product units 117, such as roll clusters coming from a depanner, are allowed to accumulate at the marshaling station 29 having the infeed belts 35. Initially, the leading product units or clusters are held up by the sponge rollers 68 and 69 until both lanes are filled with product units at the marshaling station. This is before the rapid infeed rollers 68 and 69 begin to turn. Subsequently, all leading product units in the two rows are held up or restrained by the hold-down grids 40 and 41.

It should be borne in mind that the product units enter the marshaling station in the two rows either bottom side up or bottom side down in both rows or either row. This is why the method and apparatus is made flexible with respect to the lateral positioning of the turn-over mechanism over either product row or over both rows, in some instances, where plural inverting is required and is accomplished with side-by-side identical turn-over mechanisms.

With the situation illustrated in the drawings where it is desired to invert the product units in one row only, the operation continues in the following manner. The hold-down grids 40 and 41, when down, press the leading product units down against the rods 39 to restrain them while the slack belts 35 yield and simply slide beneath the product units. Photoelectric cells, not shown, may be utilized to detect the presence of product units entering the rapid infeed rollers 68 and 69 and leaving this area. Such detection means can be used to control the operation of the hold-down grids 40 and 41 thereby properly timing the release of the leading product units for entry into the rapid infeed rollers and delivery into the turn-over mechanism and onto the conveyor section 118 for the row which is not utilizing a turn-over mechanism. Numerous variations in the control and timing means can be employed at this part of the apparatus and here the apparatus has a wide range of versatility in its operation.

In any event, the hold-down grids 40 and 41 elevate in proper sequence to release a leading product unit from the marshaling station in each row after the rapid infeed rollers 68 and 69 have propelled a product unit 117 into the passage 95 of the turn-over mechanism. As shown by the spacing of the product units 117 at the left-hand portion of FIG. 1, there is a time delay interval in the operation of grids 40 and 41 to assure a proper lateral relationship of adjacent product units in the two rows following the inverting operation in the one row.

Following the inverting operation at the station 31 which has already been described in full detail, the product units in the two rows advance on the belts 127 and 128 leading respectively to the slide bars 131 and to the slightly elevated crossover conveyor mechanism. The operation of these components has been described in detail and need not be repeated. Finally, as described, the companion product units emerge from the apparatus in accurately stacked relation for passage on to packaging equipment or the like.

In FIG. 18 of the drawings, there is shown somewhat diagrammatically a modification of the apparatus at the inlet side of the turn-over station 31. In this figure, rapid infeed rollers 68a and 69a are arranged somewhat closer to the turn-over mechanism than in the first embodiment shown in FIG. 10. Additionally, the previously-described guide roller means 38 between the rapid infeed rollers and the turn-over mechanism has been eliminated and also the guide roller means 37 is eliminated, FIG. 10. In place of this arrangement, infeed conveyor belts 35a terminate ahead of infeed rollers 68a and 69a and engage a guide roller 38a at approximately the level of the roller 69a. Relatively small transfer rollers 39a are disposed on opposite sides of infeed roller 69a, and assure a smooth transferring of the product units from the belts 35a to the rapid infeed rollers and from these rollers into the chamber formed between the plates 94 of the turn-over mechanism.

The advantage of the construction in FIG. 18 is that the belts 35a no longer pass between the infeed rollers as depicted in FIG. 10 and the necessity for forming the lower infeed roller in segments such as shown at 74 in FIGS. 6 and 9 is eliminated, and the lower infeed roller, like the upper one, may be formed in continuous sections. The construction is considerably simpler and more economical. The general mode of operation of the apparatus is not effected at all by this modification and, except as described above, all other parts and their functions are identical with the first embodiment.

The method and apparatus are characterized by simplicity, speed of operation, and reliability, without damage to the product. The apparatus is highly versatile, as explained. Its advantages should be readily apparent to those skilled in the art.

It is to be understood that the forms of the invention herewith shown and described are to be taken as a preferred example of the same, and that various changes in the shape, size and arrangement of parts may be resorted to, without departing from the spirit of the invention or scope of the subjoined claims.

We claim:

1. A turn-over mechanism for a product unit comprising a relatively stationary support structure, a rotary assembly on said support structure, means forming a turn-over compartment in the rotary assembly adapted to receive a product unit while in a substantially level position, and a pusher device within said compartment forming an abutment engageable with the product unit when introduced into the compartment and operable to eject such product unit from the compartment, product unit fast in-feed means located to one side of the rotary assembly for sliding a product unit into the compartment, and mechanism means to rotate the rotary assembly intermittently and move said pusher device intermittently from one end of said compartment to the opposite end and to maintain the pusher device stationary during rotation of the assembly, said mechanism means including a D-shaped drive chain path located to one side of said rotary assembly, a drive chain movable along said path and including a straight run and a 180° semi-circular run, the axis of rotation of the rotary assembly being located midway along the straight run, chain drive means for moving the chain around the path, a drive member secured to said chain for movement therewith around the path, a direct connection joining said drive member to said pusher device, and a lost motion connection joining said drive member to said rotary assembly for movement of the rotary assembly with the drive member only during traverse of the semi-circular run, whereby movement of said drive member along said straight run moves the pusher device within said compartment and movement of said drive member along said semi-circular run rotates said pusher device and rotary assembly 180° along said axis.

2. A turn-over mechanism for a product unit comprising a stationary support structure, a rotary turn-over assembly in said support structure including a compartment for receiving a product unit, means for rotating the assembly 180°, conveyor means at one side of the mechanism for supplying a product unit to the assembly, a pusher within the compartment for ejecting a rotated product unit to the other side of the mechanism, and fast in-feed means located at the end of the conveyor means adjacent the rotary assembly for moving a product unit from the conveyor and into the compartment, said fast in-feed means comprising a pair of resilient rolls located above and below the downstream end of said conveyor means with the axes thereof lying in a plane perpendicular to the direction of movement of the product unit, and drive means for rotating said rolls at a tangential speed greater than the speed of said conveyor means whereby the conveyor means carries the product unit between said rolls and the rolls accelerate the product unit and move it into the compartment.

3. A turn-over mechanism for a product unit comprising a stationary support structure, a rotary assembly on said support structure including a horizontal axis, a turn-over compartment in the rotary assembly adapted to receive a product unit, a pusher within said compartment movable in said compartment to eject the product unit from the compartment, and a drive assembly including a D-shaped drive chain path oriented perpendicularly to said axis, a drive chain movable along said path and including a straight run and a 180° semi-circular run, said axis being located midway along the straight run, chain drive means for moving the chain around the path, a drive member on the chain for movement therewith around the path, a direct connection joining said drive member to said pusher, and a lost motion connection joining said drive member to said rotary assembly for movement of the rotary assembly with the drive member only during traverse of the semi-circular run, whereby movement of said drive member along said straight run moves the pusher within said compartment and movement of said drive member along said semi-circular run rotates said pusher and rotary assembly about said axis.

* * * * *